Dec. 16, 1952    L. F. GUIMBRETIERE ET AL    2,621,512
TENSION TESTING APPARATUS

Filed Dec. 26, 1947    8 Sheets-Sheet 1

INVENTORS:
Louis Francois Guimbretiere
Eugene Jean Sarez
By — Frank H. Wisch
Attorney in fact.

Dec. 16, 1952     L. F. GUIMBRETIERE ET AL     2,621,512
TENSION TESTING APPARATUS

Filed Dec. 26, 1947     8 Sheets-Sheet 3

INVENTORS:
Louis Francois Guimbretiere
Eugene Jean Sorez
By Frank H. Wisch
Attorney in fact

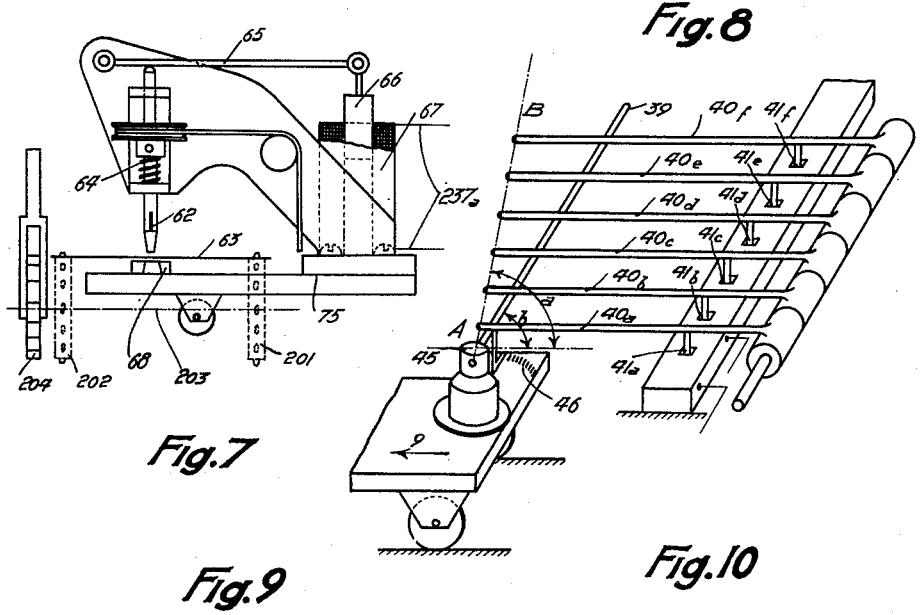
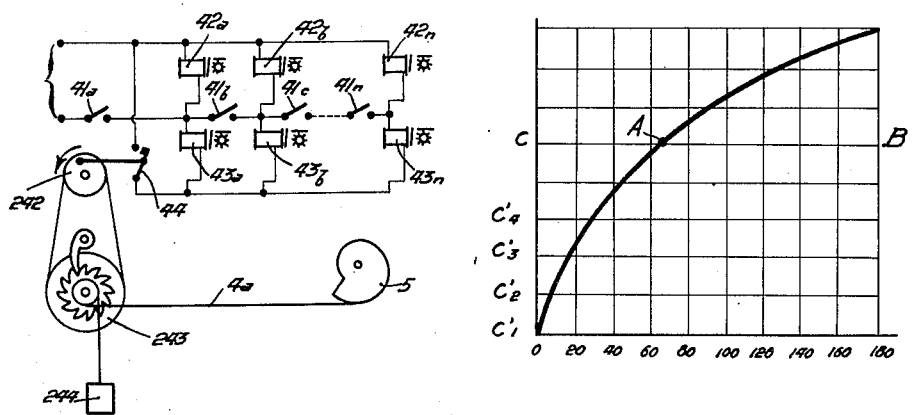
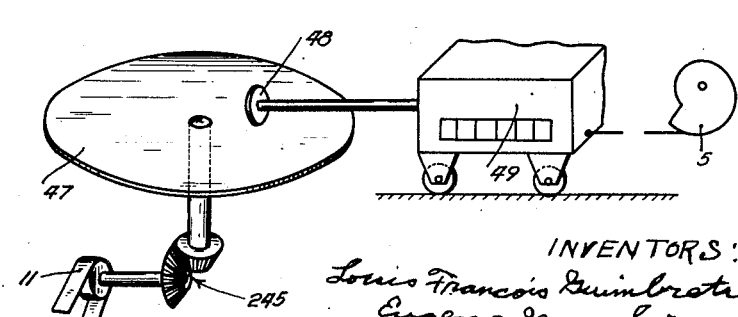

Dec. 16, 1952 L. F. GUIMBRETIERE ET AL 2,621,512
TENSION TESTING APPARATUS
Filed Dec. 26, 1947 8 Sheets-Sheet 5
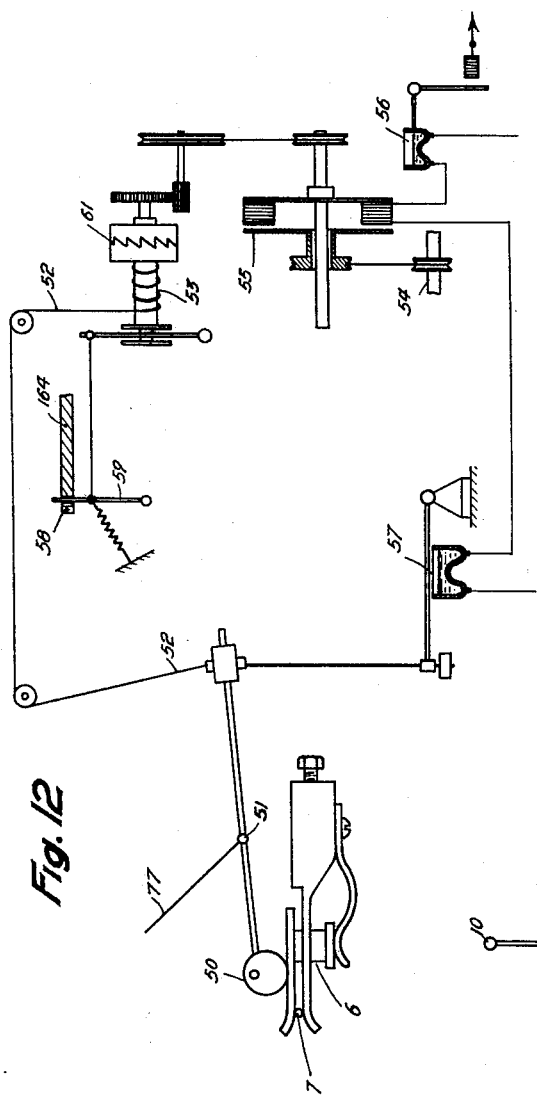
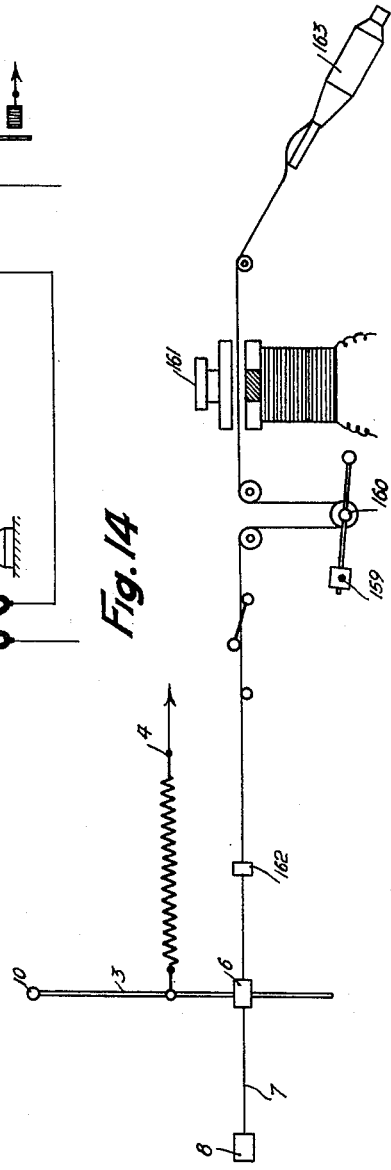
INVENTORS:
Louis Francois Guimbretiere
Eugene Jean Sorey
By Frank H. Wisch
Attorney in fact.

Dec. 16, 1952     L. F. GUIMBRETIERE ET AL     2,621,512
TENSION TESTING APPARATUS
Filed Dec. 26, 1947     8 Sheets-Sheet 6
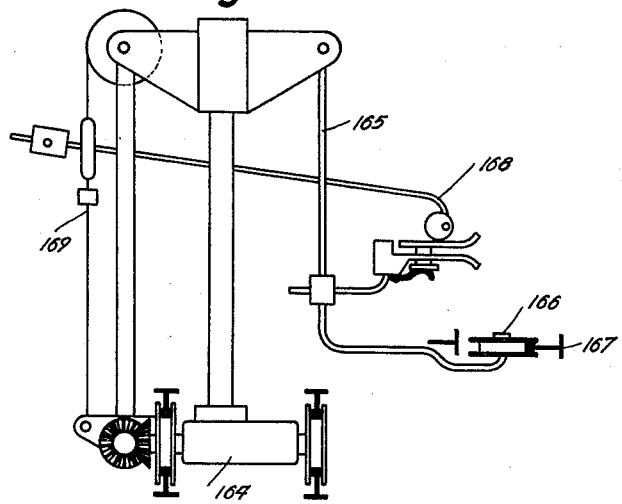
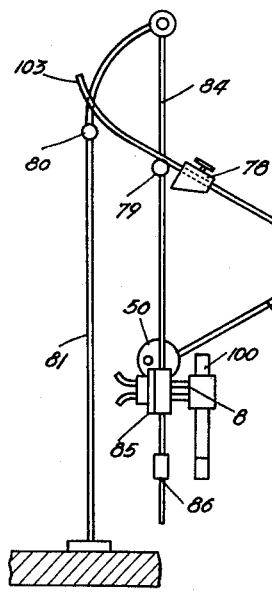
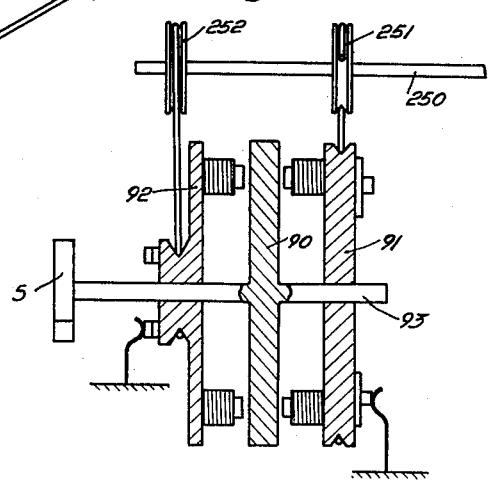
INVENTORS:
Louis Francois Guimbretiere
Eugene Jean Sorez
By Frank H. Hirsch
Attorney in fact.

Dec. 16, 1952  L. F. GUIMBRETIERE ET AL  2,621,512
TENSION TESTING APPARATUS
Filed Dec. 26, 1947  8 Sheets-Sheet 7

INVENTORS:
Louis Francois Guimbretiere
Eugene Jean Sorez
By Frank H. Wisch
Attorney In Fact.

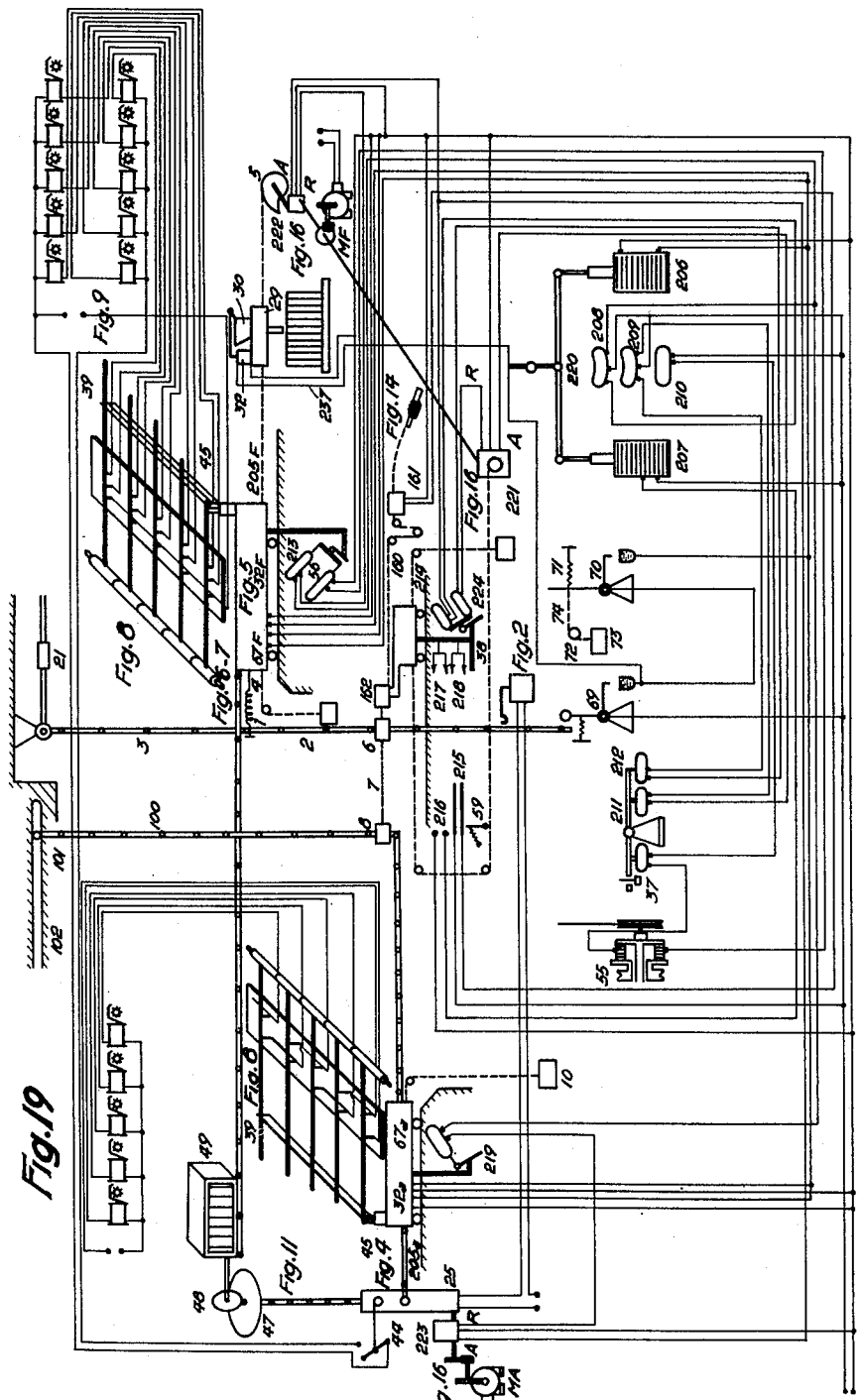

Patented Dec. 16, 1952

2,621,512

UNITED STATES PATENT OFFICE 2,621,512

TENSION TESTING APPARATUS

Louis François Guimbretiere, Montfaucon, and Eugene Jean Sorez, Roubaix, France

Application December 26, 1947, Serial No. 794,025
In France December 27, 1946

21 Claims. (Cl. 73—89)

The machines and apparatuses known to this day that serve for any kind of industrial control and industrial tests relating for instance to elongation before breaking, breaking load, power absorbed before breaking, elastic limit, breakdown voltage, electric conductivity and the like, are generally designed for the execution of a comparatively reduced number of tests. They are generally not automatic and do not give out directly in a statistical form the results of the tests executed.

The following drawbacks are thus provided:

Loss of time during operation, and consequently strict limitation of the number of tests that it is possible to make without exaggerated expense.

Introduction of further causes of errors by reason of the personal interference of the operators.

Loss of time and supplementary errors in the interpretation of the elementary results of the tests in their statistic translation and their subsequent exploitation.

Our invention has for its object a general method for executing testing apparatuses and machines for testing, that produce directly statistical results and that are applicable to all materials to be tested and to any kind of testing. It covers also the testing apparatuses and machines obtained in accordance with such principles.

Our invention consists essentially in the following points:

The magnitude or magnitudes measured are translated into displacements of one or more movable members, the amplitudes of said displacements depending on the value of the magnitude or magnitudes considered.

These displacements appear materially and are recorded at the end of each test:

(a) Either through the operation of suitable measuring or metering means;

(b) Or else by the dropping of balls into one or more channels, grooves, tubes or the like equivalent devices, the order ascribed to which corresponds to the value of the magnitude to be measured;

(c) Or by the suitable inscription on or perforating of one or more graphs that record in their order of execution the successive results of the tests;

(d) Or through the periodical photographic or printed recording of the partial results recorded by metering means;

(e) Or through an association of such means.

Suitable auxiliary devices may provide if desired the following operations, inter alia:

The adaptation to any desired value of the speed of application of the tested stress;

The adjustment to any desired value of the number of tests provided for a series of tests;

The automatic ejection of a sample after each test;

The interruption of the operation of the apparatus when the predetermined number of tests has been executed.

After the execution of a complete series of tests it is possible to obtain further results as follows:

The distribution of the balls dropped into the different receiving grooves provides in an immediate manner a material showing of the total statistics of the series of tests: the use of series of balls that are differently marked either as concerns their color or their nature allows studying within the total statistics, separate subordinate statistics corresponding to the secondary distribution of the different series of balls.

The numeric indications provided by the totalising meters provide the sum of the elementary results whereby it is possible to ascertain the mean value of the tests, their dispersion and the rate of said dispersion.

The exploitation of the perforated graphs by means of a suitable automatic analyser allows the statistical definition of the systematic and periodical differences that may appear in the production of the samples that are being studied even when they are concealed by the Gauss dispersion of the elementary tests.

By way of examples of application of our improved method and by no means in a limitative sense, we have described hereinafter an automatic statistic dynamometer for the tractional test of material under the form of wires, threads, staple strips or the like. In the accompanying drawings:

Fig. 4 illustrates diagrammatically electromagnetic braking means applicable to the machine illustrated.

Figs. 5, 6 and 7 illustrate diagrammatically different recording means that may be associated with the machine.

Fig. 8 relates to electric recording means of elongations as functions of the forces applied.

Fig. 9 is a corresponding wiring diagram.

Fig. 10 is a graph of the operation of last mentioned means.

Fig. 11 relates to means for integrating the work spent in each dynamometric test.

Figs. 12, 13, 14, 15 and 15a illustrate diagrammatically various detail arrangements that may be associated with the machine.

Figure 17:
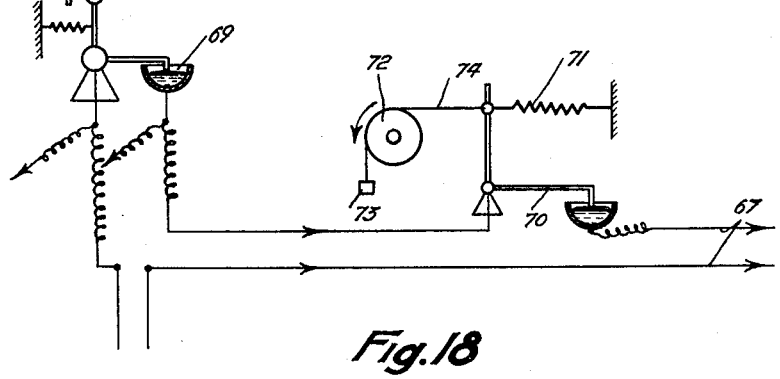
Figure 18:
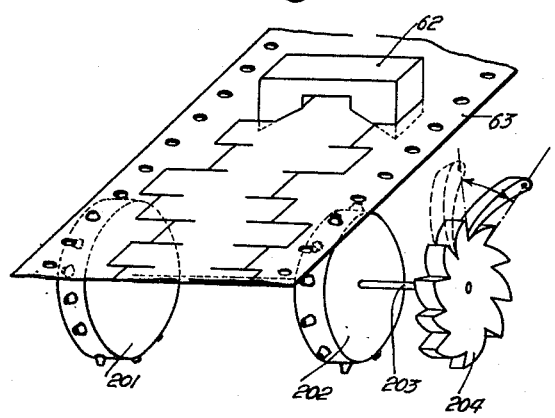

Figs. 16, 17 and 18 relate to still further auxiliary details.

Fig. 19 is a general schematic view of the machine.

Returning to Fig. 1, our improved automatic statistical dynamometer as shown diagrammatically in said figure includes a suitably gauged dynamometric spring 1 connected on one hand with the point 2 of a pendular lever 3 that is substantially stationary and on the other hand to an arrangement submitting said spring to a tractional stress in accordance with a law such as that governing the speed of application of the force as a function of time, said tractional stress being selected in accordance with the nature of the tests that are to be executed, for instance a winding of the rope 4 connected with the spring over a suitably shaped cam 5 that submits the dynamometric spring 1 to an elongation which is a function of the shape of the cam 5, said elongation resulting in a force applied to the substantially stationary pendular lever 3 that increases in proportion with the rotation of the motor 233 which drives the cam 5 through a worm and gear arrangement 234, 235. Said rotation being constant all over a test, the rotation of the cam is in proportion with time, the shape of said cam introducing the function of time. The pendular lever 3 carries a clamp 6 that is also substantially stationary and between the jaws of which the thread to be tested 7 is introduced through a suitable leading device.

The other end of the wire 7 is clamped between the jaws of the movable clamp 8 that is secured to the carriage 9. The carriage 9 is urged rearwardly by a counterweight 10 or by any other equivalent device. It is driven forwardly by a winch 11 operating at a variable speed and producing the displacement of the clamp 8 and thereby a lengthening of the test thread 7 during operation. The variations in speed of the winch 11 may be controlled in various manners through the agency of a suitable auxiliary motor as controlled by the exceedingly small modifications in position of the substantially stationary clamp 6.

The auxiliary motor M may be controlled for instance as follows:

The displacements of the substantially stationary clamp 6 may be of a magnitude as small as may be required by the nature of the material that is being tested and this is obtained by means of a suitable distribution of the points 2 and 6 along the pendular lever 3. This pendular lever 3 controls through a lever 230 pivoted at 231 on a shaft and which is applied at 232 against said lever the opening or closing of a mercury valve 12 in which the mercury may be replaced by any other suitable electrically conductive liquid.

Figure 2:
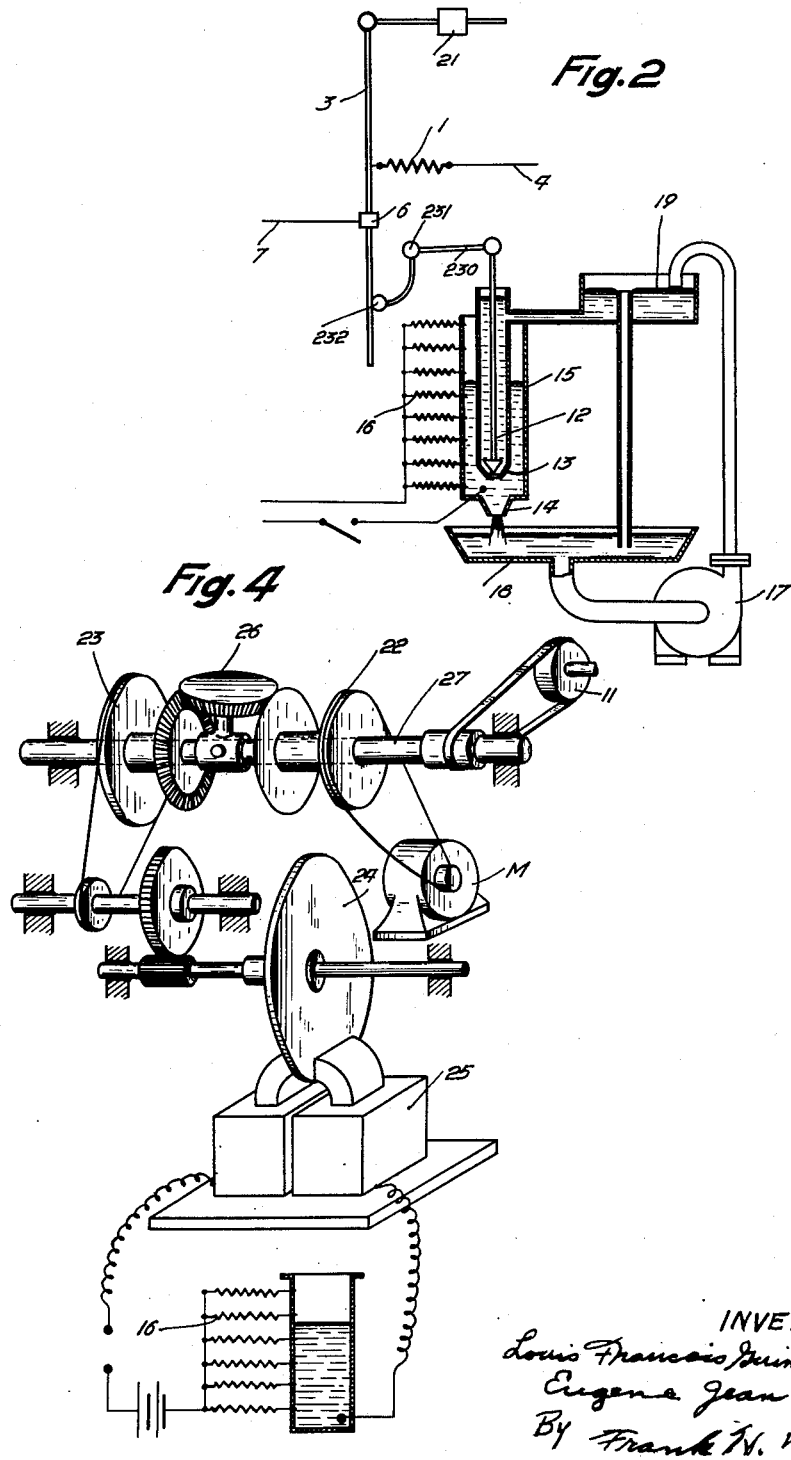
Fig. 2 is a detail thereof.

According as to whether the pendular lever 3 rocks in one direction or the other, the valve 12 opens or closes as illustrated in Fig. 2 and the output of mercury through the superposed nozzles 13 and 14 varies. The level of the mercury in the column 15 rises or sinks and short-circuits thereby a variable fraction of the resistances 16. These variations in the resistances 16 are made use of in the adjustment of the speed of the winch 11.

Suitable auxiliary devices such as a circulating pump 17, settling tanks 18, a constant level container 19 ensure stability of operation of the machine. In brief, the speed of elongation of the thread under the action of the carriage 9 is thus controlled by the law governing the application of the load as a function of time, said law being incorporated in the characteristics of the spring 1 and in the outline of the cam 5. From the preceding disclosure, it is apparent that:

The path travelled over by the carriage 9 is proportional to the elongation to which the sample 17 is submitted;

The amount of expansion of the spring 1 is proportional to the tractional forces exerted on the thread 7.

It should be noticed that suitable auxiliary arrangements allow the adjustment to any desired extent of the ratio between the displacement of the carriage 9 and the elongation to which the test sample has been actually submitted. By way of example and by no means in a limitative sense, we have illustrated in Fig. 1 a differential winch 20, 20a with an adjustable pulley ratio, associated with an also adjustable lever 100.

Figure 3:
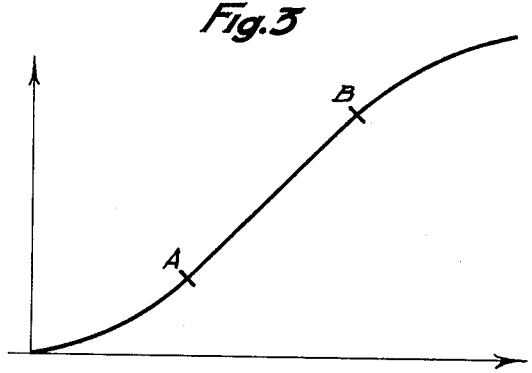
Fig. 3 illustrates the curve corresponding to the law of elongation of the spring therein with reference to the load.

The curve relating the ratio between the load of a spring and its elongation appears generally under the form of the curve of Fig. 3. It is of interest to use the spring in the rectilinear part AB of its characteristic. To this purpose, the pendular lever 3 is provided with an adjustable counterweight 21 or any other suitable device so as to tension the spring 1 before the beginning of the tractional operations applied to the thread 7.

Figure 1:
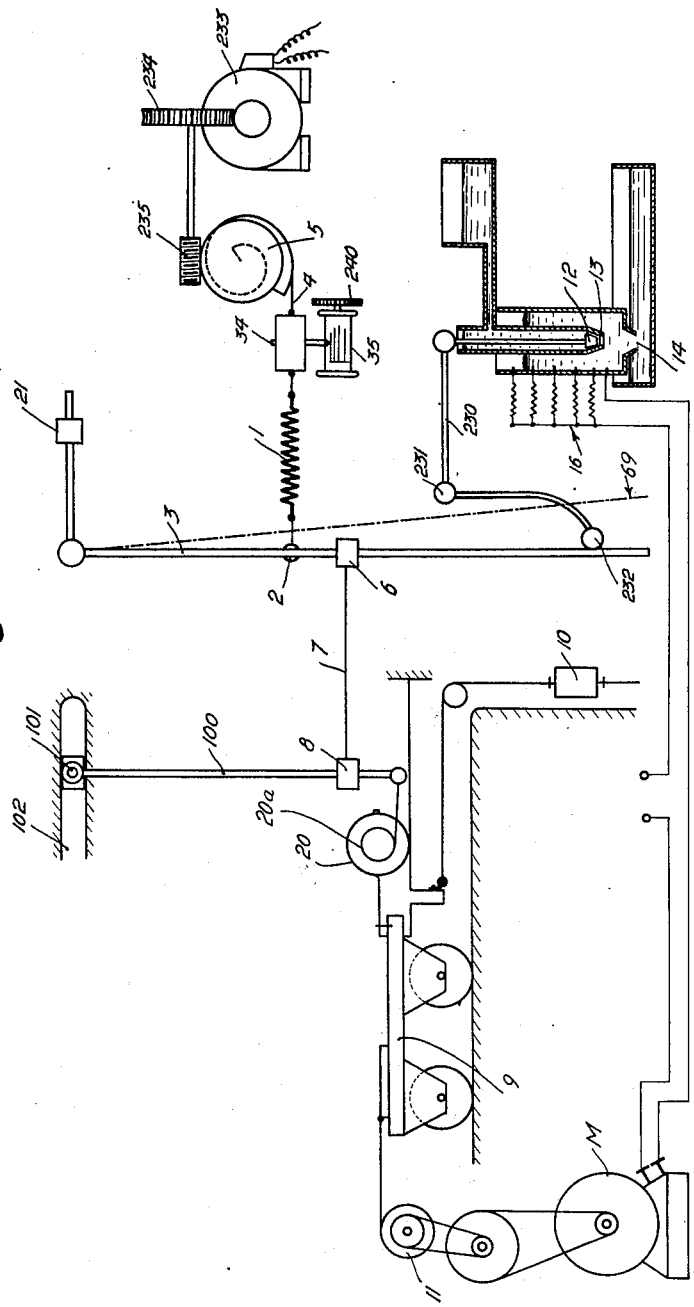
Fig. 1 illustrates an automatic statistic dynamometer of this type.

The displacements of the carriage 9 are controlled by the winch 11 that may be carried either by the carriage itself or by the frame of the apparatus. The speed of displacement of the carriage 9 may be adjusted to the variations in position of the pendular lever 3, for instance:

Through the insertion of the above-mentioned resistances 16 such as shown in Fig. 1 in the electric feed circuit of the motor driving the winch 11; or through an electromagnetic braking of the planet wheel of a suitable sum and planet gear, or again through any suitable other method.

By way of example and by no means in a limitative sense, we have disclosed hereinafter means for executing the method consisting in braking a planet pinion (see Fig. 4):

The pulley 22 drives a sun-and-planet gear 26 and is driven itself by a motor M that may either be the general motor of the dynamometer or an auxiliary motor. Another pulley 23 keyed to the auxiliary shaft of the sun-and-planet gear is operatively connected with a metal disc 24 rotating between the poles of an electromagnet 25. The latter is fed with current adjusted at any moment through the insertion in its circuit of the variable adjusting resistances 16 that are controlled as disclosed hereinabove through the operation of the mercury valve system 12—13 under the control of the lever 3. The energization of the electromagnet varies thus instantaneously in accordance with the position of the pendular lever 3 that governs the operation of the resistances 16 so as to produce a more or less energetic braking of the disc 24. It is apparent that the output shaft 27 of the sun-and-planet gear is controlled differentially by the control bevel gear on the left hand side submitted to the action of the metal disc and by the driving bevel gear to the right, and that said output shaft controls in its turn the winch 11.

Under such conditions, the driving torque of variable power applied to the winch 11 allows adjusting at any moment the speed of elongation of the thread 7 so as to produce exactly the compensation of the tractional stress exerted on the spring 1 by the simultaneous elongation of the test thread 7.

The operation of the dynamometer is as follows.

First operation: Traction exerted on the sample and dynamometric measure. The winch driving the cam 5 produces an expansion of the spring 1 in accordance with the outline selected for the cam. During said operation, the movement of the carriage 9 progresses, said progression under the action of the motor M being such that the end of the sample 7 in the clamp 6 is stationary, the other end of said sample being clamped by the clamp 8 the position of which is controlled through the differential winch 20, 20a by the progression of the carriage 9, the displacement of the carriage 9 being a function of the expansion of the sample 7. At the moment of the breaking of the sample, the pendular lever 3 is dynamically submitted to the action of the spring 1. This produces a closing of the auxiliary switch 69 whereby a suitable system of relays fully described hereunder with reference to Fig. 17, is caused to produce a reversal in the operation of the motor or motors incorrorated in the machine. The whole machine including the means for measuring the elongation and the arrangement for measuring the forces returns to zero.

Figure 5:
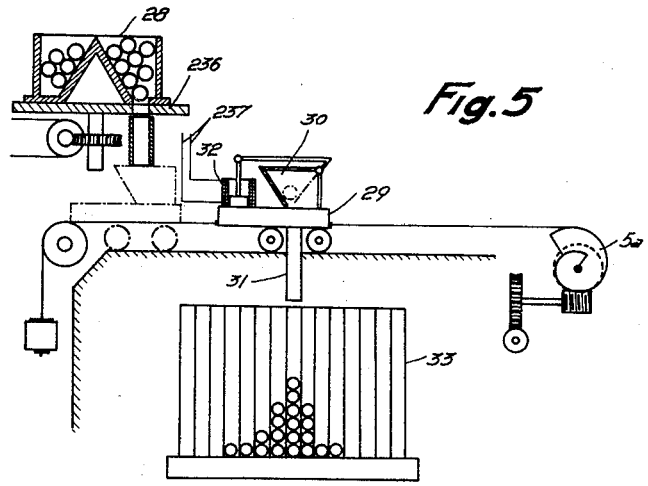
Figure 6:
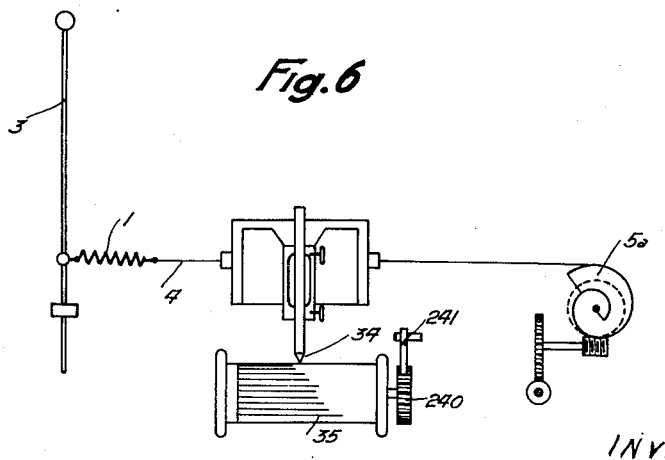

Recording of the breaking forces: The device for recording the breaking forces includes without this enumeration being at all limitative any of the following arrangements:

A ball distributing, conveying and receiving system as shown in Fig. 5;

A graph as illustrated in Fig. 6;

Or a perforating recording system as shown in Fig. 7.

The ball distributor 28 described hereinafter as a first form of execution of the recording means of the first type is designed so as to release a ball at the beginning of each test (Fig. 5).

The ball conveyor may for instance be constituted by a movable carriage 29 provided with a feed hopper 30 and a discharge port 31 the opening of which is controlled by an electromagnet 32 the circuit of which is controlled in its turn by the switch 69 actuated by the rocking of the lever 3. The ball receiver is then constituted by a grooved plate 33 assuming a sloping position or by a series of parallel transparent tubes or any like arrangement. The order of said grooves is such that they correspond to the successive breaking loads of which it is desired to form statistics.

As soon as a dynamometric operation begins the plate 236 of the distributor 28 rotates by a turn allowing a ball to fall into the hopper 30 oof the carriage 29. Said carriage being inserted in the wire 4 (as shown in Fig. 19) its advances when the force applied to the sample 7 increases, the abscissa of the discharge port 31 of the hopper being thus at every moment proportional to the force to which the sample 7 is submitted at the moment considered. At the moment of the breaking of the sample 7, the pendular lever 3 (Fig. 1) returns suddenly back and rocks so as to control the switch 69 which latter in its turn produces through the energization of the electromagnet 32 which is fed through a circuit 237 controlled by the switch 69 the dropping of the ball into the groove corresponding to the final stress exerted after which the carriage 29 returns at an accelerated speed to its starting point. This being performed, the cycle of operations begins over again.

The accumulation of the balls in the different grooves of the plate 33 forms a material visualization of the statistics concerning the tests as they are progressing.

Instead of the above described ball conveyor we may use a graphical recording device comprising a recording stylus 34 cooperating with a paper strip 35.

During a test, the relative displacements of the stylus 34 with reference to the record paper 35 are at every moment proportional to the stress exerted on the sample 7 the stylus 34 being inserted in the wire 4 which extends the spring 1 (see Fig. 1). On the other hand, after each test, the strip of paper progresses through a constant length this being obtained through a ratchet wheel 240 which is turned by a certain angle after each test. The juxtaposition of the successive lines drawn by the stylus 34 on the paper 35 provides a chronological graph of the series of tests executed by the machine.

As stated, the recording may also be executed by means of a perforating recording system that may as in the example illustrated in Fig. 7 include a punch 62 and a recording strip 63.

During the execution of a test, the punch 62 moves above the strip 63 without touching it and the relative displacements of said members are at every moment proportional to the stresses to which the sample 7 is submitted. At the moment of the breaking of the sample 7, the rocking of the pendular lever 3 leads to the engagement of the punch 62 into the strip 63 through the energization of a suitable electromechanical device 65, 66, 67 the electromagnet 67 of which is fed by an electric circuit 237a controlled by the contact 69. The perforation being thus executed, its distance from the point registering with the punch at the starting of the movement is proportional to the breaking load of the sample 7 and the recording device returns then to zero while the strip 63 advances through one step at least equal to the diameter of a perforation so as to avoid the tearing of the paper.

We will describe at the end of the present specification another form of execution of such a statistical perforating device.

Electrical recording of the elongation under the action of the forces exerted. We will first recall to mind that the carriage 9 progresses through amounts equal or proportional to the extension to which the sample 7 is submitted, as the other end of the sample carried by the clamp 2 may be considered as stationary. The electrical recording means is constituted as follows:

The carriage 9 (Fig. 8) carries an angularly adjustable arm 39 on which may rest horizontal rods 40a, 40b, 40c, 40d. Said rods are parallel to the path of the carriage 9 and are spaced by equal amounts while their length varies by equal amounts from one rod to the next, say by 10 mm. from one rod to the next. Under such conditions, the ends of the rods are in alignment over a common straight line AB forming a certain angle $a$ with the path of the carriage 9. Each time the carriage 9 progresses by said 10 mm. for instance, one of the rods 40 drops and closes an electric switch 41 (41a, 41b, etc.) so as to close the electric circuit corresponding thereto. Each switch 41, as shown in Fig. 9, feeds two electric pulse meters 42—43 of the type for instance of telephone call meters. Each meter of the series 42 (42a, 42b, etc.) records once at the moment of each closing of the corresponding switch 41. Each meter of the series 43 (43a, 43b) records a number of pulses that is proportional at each moment to the increase in force acting on the sample 7 measured since the moment of the closing of the corresponding switch 41. These electric pulses are produced by a current breaker 44 operating at a rhythm depending on the law governing the application of the force to the sample 7 through the agency of the cam 5. Said switch actuator is driven by a pulley 242 driven by a pulley 243 provided with a ratchet wheel forming non return device, said pulley being frictionally driven through a wire 4a drawn by the cam 5 and tensiled by a counterweight 244, the frictional connection and the non return ratchet wheel being provided to allow the return to zero without the switch being operated.

The operation of last described arrangement is as follows as apparent from Fig. 10:

The elongation of each tested sample is indicated by the number expressed in lengths, of the meter of the series 42 that has been the last to operate during the test considered; the value of the elongation corresponding to one half of the interval separating two successive meters should be added.

Each meter of the series 43 records an abscissa starting from the point at which the elongation corresponding to its number is reached and that extends from this point onwards up to breaking value. The numbers of pulses registered by the different meters of the series 43 are proportional to said forces and are expressed in grams.

It is possible to totalise the numbers given out by the meters of the series 43 that have operated so as to obtain an actual integration measuring the work absorbed by the sample before its breaking.

It is obvious that the relative position of the different rods 40 and of the bar 39 may be changed without any modification in the principle of the apparatus. Similarly the relative movement of the members 39 and 40 may be controlled either directly by the carriage 9 as shown or else through the agency of any suitable member assuming proportional displacements such as a camshaft or any like arrangement.

It has been stated that the arm 39 is angularly shiftable round a pivot 45 mounted on the carriage 9. Supposing b is the angle formed by the arm 39 with the direction of translation of a carriage 9, the adjustment of the angle b—a may be obtained through a rotation of the arm 39 round the pivot 45 and its final clamping so as to obtain any desired value for the value of the extension of the sample 7 that corresponds to the dropping of a given lever 40 and to the closing of a switch 41. A suitable scale 46 gives out through mere reading the value in millimeters for instance of the elongation that may be recorded by the dropping of a lever or bar 40.

Execution of the average graph binding force to elongation in the case of a series of dynamometric tests. The use of the numbers registered by the meters of the series 42 and 43 allows the execution of such an average diagram binding the forces to the elongations in a series of dynamometric tests.

The accuracy of the registration that has been just described depends obviously on the number of levers 40 and of meters 42 and 43 associated therewith. In practice a series of 25 levers and twice 25 pulse meters provides for each elementary test an accuracy of ±2% as concerns elongation, ±2% as concerns force and ±4% as concerns breaking power. The total accuracy reached in the statistics of the tests is therefore very high.

Obviously, the number of levers and meters may be adapted to any requirements as to the accuracy of the measure.

The integration of the breaking work spent in each dynamometric test is possibly obtained in the following manner (Fig. 11). A plate 47 rotates at a speed proportional to one of the two magnitudes, force or elongation. In the drawings this disc is shown as rotated at a speed proportional to the elongation, its central shaft being indeed driven through a conical gear 245 fast with the shaft of the winch 11 which moves the carriage 9 so as to counter-balance the elongation of the tested wire. A roller 48 driving a totaliser 49 moves over a radius of the disc 47 so that the distance between its contacting point and the center of the disc 47 may be at every moment proportional to the other magnitude, elongation or force. In the drawings this distance is proportional to the force applied, the roller being moved through a wire which is drawn by the cam 5 in accordance with the wire 4. Under such conditions, the totaliser 49 forms an integrator of the elementary breaking work.

Statistical information as provided by the above described machine, either under the form of a distribution of balls or of the execution of an average diagram associating forces and elongations or again under the form of pulse numbers recorded by meters, allows the automatic reckoning of statistical data such as mean value, absolute variation, relative variation, absolute probable variation, relative probable variation, absolute quadratic variation, relative quadrative variation, typical variation, variability, dispersion and so on. All these magnitudes are of considerable industrial interest.

The length of each sample may be adjusted to any desired value which is the same for a series of tests. The length of said samples has a direct influence on the dispersion of the results of the tests and forms thus an important criterion as to the grade of the material undergoing test. Moreover, this feature is of considerable interest when looking out for systematic or periodical variations ascribable to the method of producing of the thread or wire.

Auxiliary mechanical movement

*Opening of the clamps 6 and 8 (Fig. 12)*.—The opening of either clamp may be obtained for instance through the rotation of an eccenter 50 controlled by a lever 51, a rope 52 and a winch 53 connected with the general control means 54 through an electromagnetic clutch 55. At a certain point of the return to zero of the recording system, an electric switch closes at 56 in order to energize the clutch 55. The winch 53 then winds up the rope 52 which raises the lever 51 and opens the clamp. The stroke of the lever 51 is limited by the de-energization of the electromagnetic clutch the circuit feeding which is opened through the rocking of the switch 57 at the end of the stroke of the lever 51 controlling the eccenter 50 and acting on said switch.

*Closing of the clamps 6 and 8 (Fig. 12).*—The clamps 6 and 8 being open, the thread-laying device described hereinafter is started. At the end of its stroke, the thread-laying carriage 58 abuts against a lever 59 through the stop 60 carried thereby so as to provide the disengagement of the claw clutch 61 and the release of the winch 53. Under the action of suitable weights or any other suitable arrangements, the levers 51 fall back and close the clamps 6 and 8.

*Feeding and laying of the thread 7 in the open clamps 6 and 8 (Figs. 13 and 14).*—The auxiliary thread feeding device may include for instance a clamp 162 adapted to take hold of the thread to be tested as near as possible the substantially stationary clamp 6 between the latter and the reel of the thread to be tested 163. The feed clamp 162 conveyed through a suitable carriage 164 engages the thread to be tested between the jaws of the clamps 6 and 8 at the moment of their opening. This movement is produced through the energization of an electromagnetic clutch or any like system controlled by the movement of the lever associated with the clamps 6 and 8. When the clamps 6 and 8 have been closed again, the feed clamp 162 opens and returns to its starting position.

*Feeding, twisting and laying of a spinning staple between the clamps 6 and 8.*—In the case where the automatic statistic dynamometer is used for testing staples before spinning, the feed device disclosed precedingly may be associated with a suitable mechanism for giving the textile staple a sufficient torsion. Said mechanism has for its object to bestow on the staple a cohesion such that it may suitably support the tractional efforts impressed thereon by the machine.

A similar arrangement may be used for the systematic study of tractional tests, the tractional strain being for instance associated with a torsional or securing strain.

*Arrangement for giving the thread a constant tension at the beginning of the test.*—It is obviously important that all the elementary tests of a given series may be executed under perfectly identical experimental conditions. In particular, the constancy of the tension of the samples at the start should be perfectly ensured. To this purpose, it is possible to adopt by way of an example chosen among numerous solutions, the arrangement shown diagrammatically in Fig. 14. In this example the thread wound off the reel 163 passes between the jaws of a clamp 161 that is controlled electromagnetically for instance and then round a pulley 160 rigid with a lever that is submitted to a suitable load as shown at 159. When the conveyor carriage 164 comes nearer the thread drawing clamp 8, a contact closes that produces the closing of the clamp 161 on the thread. The lever 159 is then operative and gives the thread 7 the predetermined initial tension.

Figure 15A:
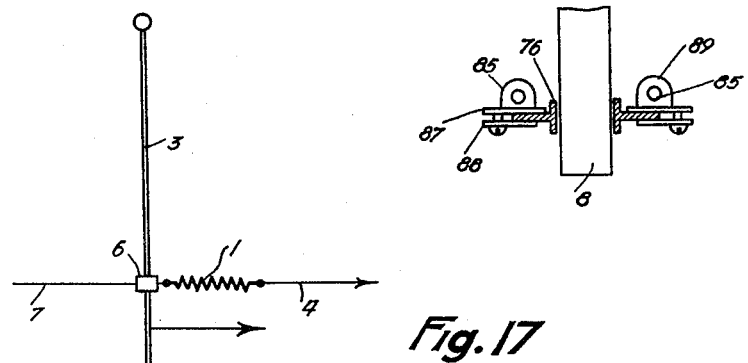

*Arrangement for ejecting the sample fraction broken by the test.*—When the sample 7 has been broken, the movable clamp 8 should be freed from the fraction of broken sample such as the end of a thread by means of a special arrangement that may be for instance that illustrated in the following arrangement as shown in Figs. 15 and 15a. The jaw 6 is freed automatically of its fraction of sample through the sample laying device.

Returning to the means releasing the broken fraction held in the clamp 8, Figs. 15 and 15a show a support 81 associated with an adjustable pivot 80 and carrying the vertical lever 84. Said lever carries an adjustable pivot 79 and an ejector of broken fractions 85 and it is held vertically by a weight 86. Said lever is incurved downwardly into a U-shape, so that the ejector 85 may surround the jaws of the clamp 8. This double ejector 85 includes for each element a ring 89 fastened to the lever 84 and to which is secured a jaw 87. Between said jaw 87 and a jaw 88 secured thereto is inserted a rubber sheet 76 folded back to form two plies and the ends of which are clamped between the jaws 87 and 88. Said rubber sheet forms an elastic ring which surrounds the clamp 8 and the edges of which rub on the lateral faces of said clamp when the vertical lever 84 is pivoted. The clamp 8 is provided with an eccentric fastening member 50 and a lever 51. At a predetermined point of the lever 51 is pivotally secured a bent lever 77 carrying a stop 78 with a sloping edge. The bent lever ends with a sloping part 103 adapted to bear at a given moment against the pivot 80 on the support 81.

At the moment at which the sample is to be changed, the eccentric 50 is controlled by a rising movement of the lever 51. The lever as it moves carries along with it the lever 84 through the agency of the stop 78 and of the pivot 79. The strap shaped end of the lever 84 is shifted off its position of equilibrium and carries along with it as it moves the remains of the sample that has just been broken; it is released and returns to its position of equilibrium when the slope 103 on the lever 77 comes into contact with the pivot 80; at this moment the stop 78 passes out of reach of the pivot 79 and the lever 84 is thus released and returns also into its position of equilibrium.

A suitable mechanism such as a conveyor belt removes the remains of the sample as they fall out of the clamp 8.

The arrangement described with reference to Figs. 15 and 15a is prevented from operating in the case of the dynamometer being used for examining elastic and permanent elongations without any breaking of the samples.

*Perforating means for the recording strip.*—A form of execution of such perforating means is illustrated in Figs. 7 and 17. A punch 62 rotates at a high speed at a small distance from the chart to be perforated 63. It is held by a spring 64 in said position and the control is provided by the general driving shaft. An oscillating lever 65 carries at its end a plunger made of magnetic material 66 that forms the core of the electromagnet 67. At the moment of the breaking of a sample, current is sent into said electromagnet that attracts the plunger. The lever 65 exerts then a substantial pressure on the upper end of the rotary punch. Said punch perforates the paper of the chart while continuing its rotation and bearing against a removable part 68 made of wood or the like suitable material. The switch 69 (Fig. 17) controlling the electromagnet 67 is closed by the shifting towards the right hand side of the pendular lever 3 at the moment of the breaking of the sample and is almost immediately afterwards opened through the general reversal of the operation of the apparatus. As a matter of fact, as shown in Fig. 17, the switch 69 is normally open during the dynamometric tractional test while the second switch 70 in series therewith remains operative under the action of the tension of the return spring 71. At the moment of the breaking, the pendular lever 3 rocks suddenly towards the right hand side and closes the switch 69 so that current feeding the electromagnet 67 may pass through the two switches 70 and 69. But the direction of rotation of the grooved pulley 72 controlled by the driving shaft changes and through the agency of the cable 74 submitted to the action of a counterweight 73 opens the switch 70 and deenergizes the electromagnet. The pressure exerted by the lever 65 on the needle valve of the rotary punch 62 lasts only one moment that is sufficient for the perforation of a hole in the chart 63, which latter is suitably carried along by a mechanism to this purpose. For instance the driving means for the chart may be constituted as illustrated by two sprocket wheels 201—202 mounted on a spindle 203 that is rigid with a ratchet wheel 204. The spring 64 raises the rotary punch as soon as the current is switched off the electromagnet 67.

The body 75 of the perforator is adapted to move with reference to the chart 63 and the movements of the perforator are always proportional to those provided for the recording stylus or the like means 34 disclosed with reference to Fig. 4.

Obviously the above described perforator may be replaced by any other equivalent arrangement adapted to cut clean edged holes in the chart without any burrs. The system for urging temporarily the punch 62 down by means of a perforating force may be obtained through the agency of a delayed relay feeding the electromagnet 67, such for instance as a measuring switch with a limited closing time. Instead of being executed by means of perforations separated from one another, the recording of the tests may be executed as follows as shown in Fig. 18 the chart of which is driven exactly in the same manner as in Fig. 7.

The bevel-shaped perforator cuts at each test a slot through the chart paper. Between two successive tests, the chart advances through a step equal to the length of a slot. The operation of the arrangement is obvious and is such that the statistics of the tests are recorded under the form of a castellated track adapted to be applied subsequently with great ease through the agency of a suitable analyser.

*Device for returning to zero at an accelerated speed*

At the moment of the breaking of the sample 7, the pendular lever 3 is dynamically drawn back by the dynamometric spring 1. This movement produces a general reversal of the machine for instance in the manner to be disclosed now with reference to Fig. 16:

The motor 233 drives the cam 5 through an arrangement with a double electromagnetic clutch including a central disc of magnetic metal 90 rigid with a shaft 93 on which is keyed the cam 5, a shaft 250 driven by the motor 233 through a reductor 234, 235; on said shaft are keyed two pulleys one of the said 251 rotates an electromagnet plate 91 in one direction and the other 251 rotates a second electromagnet plate 92 in the opposite direction at a higher speed. When the electromagnets on plate 91 are energized through the contactor 215 (Fig. 19) the cam 5 rotates with a slow speed and in a given direction during the dynamometric tractional operation. After a breaking of the sample 7 the plate 92 is energized in its turn through the contactor 224 while the circuit feeding the first electromagnets 91 is broken. As the plate 92 rotates in the direction opposed to the direction of rotation of the first plate 91 and at a much higher speed, the machine returns to zero at an increased speed.

The above described device may be replaced for instance by a variable speed electric motor adapted to be reversed or by any other known speed reversing and changing means.

The dynamometer is designed and fitted for testing under similar automatic conditions a sample 7 of any length whatever. To this purpose, the pivot 101 of the lever 100 is adjustable as to position along a slideway 102 (see Fig. 1) so as to define the starting position of the clamp 8 as desired.

The above described machine records statistics of breaking forces under the form of:

A distribution of balls (Fig. 5);
A chronological graph (Fig. 6);
Or chronological perforations (Figs. 7 and 18).

Obviously statistics of the elongations may be recorded under the same conditions as the statistics of forces. The elements of such a recording and their manner of operating are identical to those already described and it is just necessary to mention the possibility of a double statistical equipment for our automatic dynamometer.

The total statistics of the breaking work is provided at the end of a series of operations by the reading of the indications recorded by the pulse meters. The recording of the total indications given out by the numeric dials of meters is not satisfactory for examining partial statistics of the breaking power. This drawback may be set aside by equipping the dynamometer with a suitable photographic apparatus recording periodically the indications of the meters. By way of example and by no means in a limitative sense, it may be mentioned that the so-called Robot cameras are particularly suitable for such applications. Another solution to be also considered as a mere example without any binding sense attached to it consists in using meters with numeric rollers designed in a manner such that they may print periodically their indications on a record paper, this being somewhat similar to the arrangement of the so-called Printomax electric meters and apparatuses for instance.

The ball-receiving grooves may, if required, be provided with scales for instantaneously ascertaining through mere reading the number of balls carried in each grove. It is thus no longer necessary to count them separately.

These balls may either be spherical or else they may assume regular geometric shapes so as to allow a speedier or more accurate counting through a more regular stacking thereof.

Obviously the shapes, arrangements, details and sizes of the machines may vary without modifying thereby the scope of the invention as defined in accompanying claims.

In particular, the movable part or parts that are to show through their displacements the value of the magnitudes that are to be measured, obviously depend on the very nature of said magnitudes.

The auxiliary devices adapted to provide for automaticity of operation of the apparatuses and those adapted to adjust the speed of application of the test stress obviously depend on the nature of the tests executed and on the nature of the material that is being tested.

The number of metering devices and the number of ball-receiving grooves may also vary according to the degree of accuracy required for the statistics that are being performed. The chronological recording devices whether under the form of graphs, perforations or photographs, or moving pictures for prints may be modified to a considerable extent.

The number, size, color, nature and shape of the balls may be modified as desired.

What we claim is:

1. A machine for statistical tests to be executed chiefly on wires and threads comprising elastic means acting on one end of the sample being tested, means for controlling the tension exerted by said elastic means in accordance with a predetermined law with reference to time, means driving the other end of the sample away from the first end to produce an elongation of the sample in opposition to that exerted by the elastic means and means controlled by slight movements of the first end of the sample under the action of the elastic means and producing an action of last mentioned driving means that substantially balances the action of the first mentioned elastic means.

2. A machine for statistical tests to be executed chiefly on wires and threads comprising elastic means acting on one end of the sample being tested, means for controlling the tension exerted by said elastic means in accordance with a predetermined law with reference to time, means driving the other end of the sample away from the first end to produce an elongation of the sample in opposition to that exerted by the elastic means and means controlled by slight movements of the first end of the sample under the action of the elastic means and producing an action of last mentioned driving means that substantially balances the action of the first mentioned elastic means and means for producing a high speed reduction between said balancing means and the driving means.

3. A machine for testing samples of wires, threads, and the like material comprising a weighted substantially vertical lever arranged to pivot round one end and to which one end of the sample is detachably secured, a carriage adapted to move radially with reference to the vertical lever and to which the other end of the sample is secured, means controlling the movement of said carriage away from said vertical lever for exerting a tensional force on said sample, a spring urging the lever away from the carriage in the vertical plane of the sample, means for controlling the tension of the spring in accordance with a predetermined function of time, a circuit system controlling the carriage controlling means and the variable resistance inserted in said circuit system and means controlled by the vertical lever and controlling said resistance for energizing said circuit to an increasing extent as the vertical lever is shifted through small predetermined angles away from the carriage for providing equilibrium between the action of the spring and the tension of the sample.

4. An automatic statistic dynamometer for samples of elongated material comprising a weighted substantially vertical lever arranged to pivot round one end and to which one end of the sample is detachably secured, a carriage adapted to move radially with reference to the vertical lever and to which the other end of the sample is secured, means controlling the movement of said carriage away from said vertical lever for exerting a tensional force on said sample, a spring urging the lever away from the carriage in the vertical plane of the sample, means for controlling the tension of the spring in accordance with a predetermined function of time, an auxiliary motor adapted to control the movements of the carriage controlling means, a circuit feeding said motor, a rheostat controlling said circuit and thereby the speed of rotation of the auxiliary motor, and means controlled by the movement of the lever and controlling the rheostat and including a channel, means for causing a stream of mercury to pass through said channel, a valve cooperating with said channel for adjusting the flow of mercury therethrough and means for operatively connecting the lever with said valve.

5. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling the last mentioned means, a potentiometric system controlled by the vertical lever when urged by the spring through predetermined angles, a circuit controlling the speed of the motor and in which said potentiometric system is inserted for adjusting the energy of the current flowing through it in accordance with the angular position assumed by the lever.

6. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling the last mentioned means, a mercury column, means for causing the mercury to pass through said column, a valve controlling the outlet of said column, a mercury filled vat in which said column dips, means whereby the angular position of the lever controls the position of the valve with reference to the lower end of the column and thereby the level of the mercury in said vat, a circuit controlling the motor and including a plurality of horizontal resistances inserted in parallel in the circuit and located in the vat to be immersed to a varying extent by the mercury, the total resistance of the circuit and thereby the speed of the motor fed by the circuit depending on the level reached by the mercury in the vat with reference to the horizontal resistances.

7. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, a sun and planet gear, means for driving the input thereof at a constant speed, a metal disc operatively connected with the output thereof, an electromagnet adapted to act on said disc for braking same, an electric circuit feeding the electromagnet, means whereby the current flowing through said circuit is controlled by the angular location of the vertical lever and means operatively connecting the sun-and-planet gear with the carriage driving means at a speed increasing with the braking action exerted by the electromagnet for providing equilibrium between the stresses exerted by the carriage and by the spring on the sample.

8. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which the potentiometric system is inserted and energizing the motor, the speed of said motor depending on the energy flowing through the potentiometric system for the angular position assumed by the lever at the moment considered, an auxiliary switch actuated by the vertical lever when in its extreme position reached by it when the stress exerted by the spring has broken the sample, a further circuit controlled by said switch and means energized by said last mentioned circuit for returning the carriage and the spring controlling means into their starting position.

9. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, an auxiliary switch controlled by the vertical lever in the rearmost position reached by it under the action of the spring when the sample breaks, a circuit in which said switch is inserted, means controlled by this last circuit adapted to release a ball at the breaking of each sample, a body provided with adjacent grooves adapted to receive said balls and means controlled by the circuit whereby each ball when released is directed into the groove corresponding to the stress exerted on the spring at the moment of the breaking of the sample that has produced the release of the ball considered.

10. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and auxiliary switch controlled by the vertical lever in the rearmost position reached by it under the action of the spring when the sample breaks, a circuit in which said switch is inserted, a recording system including a stylus and a chart and means controlling a circuit for controlling the relative movements of the stylus with reference to the chart in accordance with the stresses to which the spring is submitted at the moment of the breaking of a sample and means for shifting the chart with reference to the stylus through a given amount each time a sample is broken.

11. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and auxiliary switch controlled by the vertical lever in the rearmost position reached by it under the action of the spring when the sample breaks, a circuit in which said switch is inserted, a recording system including a chart, a punch adapted to move perpendicularly to the surface of the chart to perforate openings therein and to move perpendicularly to the length of the chart and to this first movement in accordance at each time with the tested value to be recorded, means controlling same at the breaking of a sample and means actuated by the movement of return to zero of the spring stretching means for making the chart be shifted longitudinally through a given amount after each perforation.

12. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for recording the elongations of each sample as functions of the forces applied thereto.

13. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for recording the elongations of each sample as functions of the forces applied thereto, said means including a horizontal arm carried pivotally by the carriage and adapted to assume a predetermined adjusted angular setting with reference to the direction of elongation of the sample, a series of rods bearing on said arm and lying horizontally in parallelism with said direction of elongation and switches associated with each horizontal rod for energization thereby when the corresponding rod drops off the forwardly travelling arm, circuits in which the corresponding switches are inserted and two meters energized by each circuit and adapted to record respectively a pulse at the dropping of the corresponding horizontal rod and a number of pulses corresponding to the duration of progression of the carriage, beyond the point at which the corresponding rod has dropped.

14. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for recording and integrating at least one of the magnitudes, forces exerted and elongations obtained, throughout the testing of a sample.

15. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for opening the clamps and means controlled by the return of the spring stretching means to zero adapted to control said clamp opening means.

16. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for opening the clamps and means controlled by the return of the spring stretching means to zero adapted to control said clamp opening means, thread laying means and means controlled by the end of the operative movement of said laying means and closing the clamps.

17. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for giving each sample a predetermined tension before the beginning of its testing.

18. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means associated with the clamp secured to the vertical lever for removing the sample broken at the end of the test and means for controlling simultaneously the opening of last mentioned clamp and the removal of the broken sample through last mentioned means.

19. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, an auxiliary switch controlled by the vertical lever in the rearmost position reached by it under the action of the spring when the sample breaks, a circuit in which said switch is inserted, a recording system including a chart and to move perpendicularly to the length of the chart and to this first movement in accordance at each time with the tested value to be recorded, a punch adapted to move perpendicularly to the surface of the chart to perforate elongated openings therein, means controlling same at the breaking of a sample and means actuated by the movement of return to zero of the spring stretching means for making the chart be shifted longitudinally through a given amount after each perforation.

20. A machine for ascertaining the elongations of samples of thread or the like material comprising two clamps for the ends of the sample, a vertical pivoting lever to which one clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, an auxiliary switch controlled by the vertical lever in the rearmost position reached by it under the action of the spring when the sample breaks, a circuit in which said switch is inserted and means energized by last mentioned circuit and controlling the return of the carriage and of the spring controlling means to their starting position and means for giving an increased speed to said return movement.

21. A machine for ascertaining the elongations of samples of thread or the like material comprising two clamps for the ends of the sample, a vertical pivoting lever to which one clamp is secured, a carriage to which the other clamp is rigidly secured, a spring urging the lever in a sample tensioning direction, means controlling the stretching of the spring in accordance with a predetermined function of time, means driving the carriage radially away from the lever for tensioning the sample in opposition to the spring, an electric motor and speed reducing means associated therewith for controlling last mentioned means, a potentiometric system controlled by the vertical lever when urged by the spring through predetermined angles, a circuit in which said potentiometric system is inserted and controlling the motor at a speed depending on the energy fed through the potentiometer for the angular position assumed at the moment considered, and means for adjusting the location of the vertical lever on a line parallel to the direction of movement of the carriage.

LOUIS FRANÇOIS GUIMBRETIERE.
EUGÈNE JEAN SOREZ.

REFERENCES CITED

The following references are of record in the file of this patent:

UNITED STATES PATENTS

| Number | Name | Date |
|---|---|---|
| 2,176,016 | Sivertsen | Oct. 10, 1939 |
| 2,350,722 | Buckingham | June 6, 1944 |
| 2,411,451 | Demartini et al. | Nov. 19, 1946 |

FOREIGN PATENTS

| Number | Country | Date |
|---|---|---|
| 257,634 | Great Britain | Apr. 21, 1927 |